United States Patent [19]

Udagawa et al.

[11] Patent Number: 5,586,770

[45] Date of Patent: *Dec. 24, 1996

[54] METAL LAMINATE GASKET WITH ENGAGING DEVICE

[75] Inventors: Tsunekazu Udagawa, Ichikawa; Kenji Yamada, Tokyo, both of Japan

[73] Assignee: Ishikawa Gasket Co., Ltd., Tokyo, Japan

[*] Notice: The term of this patent shall not extend beyond the expiration date of Pat. No. 5,551,702.

[21] Appl. No.: 270,652

[22] Filed: Jul. 5, 1994

[51] Int. Cl.$^6$ ........................................ F16J 15/08
[52] U.S. Cl. ................................ 277/11; 277/235 B
[58] Field of Search ........................ 277/9–11, 235 B

[56] References Cited

U.S. PATENT DOCUMENTS

| | | | |
|---|---|---|---|
| 4,648,607 | 3/1987 | Yamanda et al. | 277/235 B |
| 4,776,601 | 10/1988 | Yamada | 277/235 B |
| 5,083,801 | 1/1992 | Okano et al. | 277/11 |
| 5,095,867 | 3/1992 | Inamura | 277/235 B |
| 5,096,325 | 3/1992 | Udagawa | 277/235 B |
| 5,154,529 | 10/1992 | Udagawa et al. | 277/235 B |
| 5,259,629 | 11/1993 | Udagawa | 277/235 B |

*Primary Examiner*—Scott Cummings
*Attorney, Agent, or Firm*—Kanesaka & Takeuchi

[57] ABSTRACT

A metal laminate gasket of the invention is engaged with an engaging projection of an engine part for immovably locating the gasket on the engine part. The gasket is basically formed of first and second metal plates laminating together. The first plate includes at least one first hole and at least one first engaging portion extending into the first hole. The second plate is situated above and connected to the first plate. The second plate includes at least one second hole and at least one second engaging portion extending into the second hole. When the gasket is urged against the engine part, the vertically spaced first and second engaging portions deform and engage the engaging projection to thereby prevent the gasket from easily disengaging from the engaging projection.

7 Claims, 1 Drawing Sheet

METAL LAMINATE GASKET WITH ENGAGING DEVICE

BACKGROUND OF THE INVENTION AND RELATED ART STATEMENT

The present invention relates to a metal laminate gasket for an internal combustion engine with an engaging device, such as a cylinder head gasket and a manifold gasket, which can be securely attached to dowels or bolts on an engine part.

When a cylinder head and a cylinder block are assembled together, the cylinder block is placed on a floor or a platform, and a gasket is placed on the cylinder block so that dowels formed on the cylinder block are located in dowel holes of the gasket. Then, the cylinder head is placed above the gasket, and the cylinder head and the cylinder block are tightened together by bolts.

In order to easily assemble the gasket on the cylinder block, the diameter or size of the dowel hole of the gasket is made slightly larger than the diameter of the dowel. Therefore, in case the cylinder block with the gasket thereon is shaken, the gasket may disengage from the cylinder block.

Especially, in a V-type engine, gasket attaching surfaces of the cylinder block incline downwardly. Therefore, even if the gaskets are installed on the gasket attaching surfaces of the cylinder block, the gaskets may disengage from the cylinder block.

Similarly, in case a manifold gasket is installed in the cylinder head having bolts for fixing a manifold to the cylinder head, the manifold gasket is placed on the cylinder head such that the bolts engage bolt holes of the manifold gasket. When the cylinder head with the manifold gasket thereon is shaken, the manifold gasket may disengage from the bolts.

In an automatic assembly line for engines, the engines are continuously or consecutively moved. In some cases, the engine parts are stopped for a while for assembly, and then moved. In the automatic assembly line, it is troublesome to check the gasket in each engine, and to install a gasket in case no gasket is placed on the engine part.

In order to solve the above problems, there had been proposed U.S. Pat. No. 5,083,801, No. 5,095,867, No. 5,096,325, No. 5,154,529 and No. 5,259,629.

In U.S. Pat. No. 5,095,867, No. 5,096,325 and No. 5,154,529, it is required to use specific dowel pins. In U.S. Pat. No. 5,083,801 and No. 5,259,624, although no specific dowel pins are required, if the gasket is shaken strongly, the gasket may still disengage from the dowel pins or bolts.

Accordingly, one object of the present invention is to provide a metal laminate gasket having an engaging device to prevent the gasket from accidentally disengaging from the engine part even if the gasket is strongly shaken.

Another object of the invention is to provide a metal laminate gasket as stated above, which can be easily installed on the engine without affecting sealing ability of the gasket.

A further object of the invention is to provide a metal laminate gasket as stated above, which can be easily and economically manufactured.

Further objects and advantages of the invention will be apparent from the following description of the invention.

SUMMARY OF THE INVENTION

In accordance with the invention, a metal laminate gasket is designed to be easily and firmly engaged with an engaging projection, such as a dowel pin and a bolt, of an engine part. Thus, the gasket can be properly positioned and immovably placed on the engine part. The gasket is not accidentally disengaged nor falls from the engine part.

The gasket is basically formed of first and second metal plates piled and connected together. The first plate includes at least one first hole formed at a portion corresponding to the engaging projection of the engine part, and at least one first engaging portion extending into the first hole.

The second plate is situated above the first plate. The second plate includes at least one second hole formed at a portion corresponding to the first hole, and at least one second engaging portion extending into the second hole.

When the first and second plates are urged against the engine part, the first and second engaging portions deform to allow the engaging projection to enter into the first and second holes, and engage the engaging projection. The first and second engaging portions are arranged vertically and independently engage the engaging projection to thereby prevent the gasket from easily disengaging from the engaging projection.

Namely, the first and second engaging portions are vertically piled or spaced from one another and are independently formed. Thus, the first and second engaging portions act independently against the engaging projection. When a lateral or vertical force is applied to the gasket, at least one of the engaging portions engages the engaging projection to thereby prevent the gasket from disengaging from the engine part.

Especially, in case the first and second plates are formed of different plates in thickness, hardness or shape, the engaging force of the engaging projections becomes different. Thus, the engaging portions surely hold the engaging projection.

In case two engaging projections situated away from each other are formed on the engine part, the gasket can be placed in a proper position on the engine part. The position of the gasket is set by the engaging projections.

Preferably, the first engaging portion is arranged angularly differently to the second engaging portion with respect to central axes of the first and second holes. Namely, the first and second engaging portions do not pile or laminate together. As a result, the first engaging portion is not affected by the second plate situated above the first plate when the gasket is properly positioned on the engine part.

The first and second plates may be connected together in a conventional method, such as welding or grommet partly covering the first and second plates. Therefore, the first and second plates do not disengage from the engine part when installed. In the gasket of the invention, one or more plate may be installed under the first plate, above the second plate or between the first and second plates to form a metal laminate gasket with three or more plates.

DETAILED DESCRIPTION OF PREFERRED EMBODIMENTS

Figure 1:
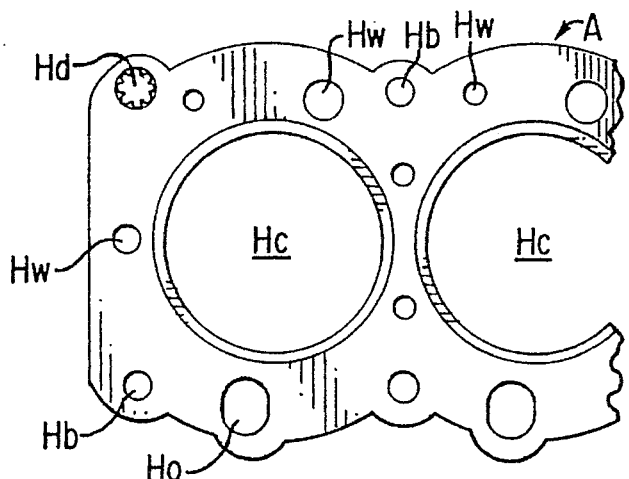
FIG. 1 is a plan view of a part of a first embodiment of the invention for constituting a cylinder head gasket.
Figure 2:
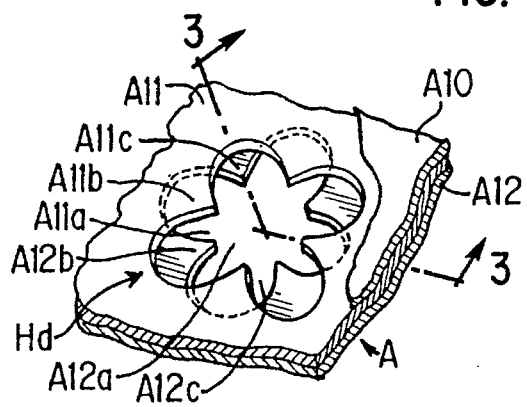
FIG. 2 is an enlarged perspective view of a dowel hole of the gasket of the invention.
Figure 3:
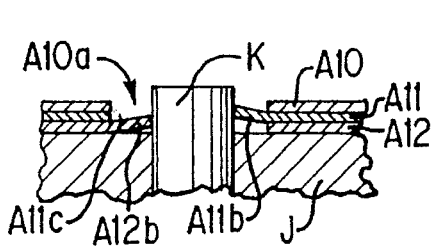
FIG. 3 is a section view taken along a line 3—3 in FIG. 2 for showing the gasket installed on a cylinder block.

Referring to FIGS. 1–3, a first embodiment A of a metal laminate gasket of the invention is shown. The gasket A is a cylinder head gasket and is provided with a plurality of cylinder bores Hc, water holes Hw, oil holes Ho, bolt holes Hb, and positioning or dowel holes Hd, as in the conventional gasket. Since the present invention is directed to the structure of the dowel holes Hd, other structure and sealing mechanisms are not explained. Any structure and sealing mechanisms may be used.

As shown in FIG. 3, the gasket A of the invention is designed to be installed on a cylinder block J with a dowel K. The dowel K has a cylindrical form and slightly projects upwardly from an upper surface of the cylinder block J. A bolt (not shown) passes through a hole of the dowel K to connect a cylinder head (not shown) to the cylinder block J.

The gasket A comprises an upper plate A10, a middle plate A11, and a lower plate A12, which extend substantially throughout the entire area of the engine. The upper plate A10 includes a hole A10a having a diameter slightly larger than the diameter of the dowel K.

The middle plate A11 is situated under the upper plate A10 and includes a hole A11a defined by four engaging or pointed portions A11b and four non-engaging or recessed portions A11c. The distance between the pointed portions A11b facing against each other is smaller than the diameter of the dowel K. The distance between the recessed portions A11c facing against each other is greater than the diameter of the dowel K. Namely, the pointed portions A11b project into a hole for the dowel K. Thus, when the middle plate A11 is pushed over the dowel K, the pointed portions A11b are slightly bent upwardly and engage the dowel K.

The lower plate A12 is situated under the middle plate A11 and includes a hole A12a defined by four engaging or pointed portions A12b and four non-engaging or recessed portions A12c. Similar to the middle plate A11, the distance between the pointed portions A12b facing against each other is smaller than the diameter of the dowel K, while the distance between the recessed portions A12c facing against each other is greater than the diameter of the dowel K. Namely, the pointed portions A12b project into a hole for the dowel K.

The middle and lower plates A11, A12 are arranged such that the pointed portions A12b of the lower plate A12 are located under the recessed portions A11c of the middle plate A11. Namely, the pointed portions A11b, A12b are angularly shifted relative to the center of the dowel hole. Thus, when the gasket A is pushed over the dowel K, the pointed portions A12b are slightly bent upwardly to be located in the recessed portions A11c and engage the dowel K, while the pointed portions A11b are slightly bent upwardly to be located in the hole A10a of the upper plate A10 and engage the dowel K.

When the plates A10, A11, A12 are assembled, the plates A10, A11, A12 are connected together by spot welding (not shown). In case a grommet or a cover member for holding the upper and lower plates is used, the plates need not be connected together by the spot welding.

When the gasket A is installed on the cylinder block J, the gasket A is placed above the cylinder block J so that the dowel K aligns the dowel hole Hd formed of holes A10a, A11a, A12a. Then, the gasket A is strongly pushed against the cylinder block J. As a result, the pointed portions A11b, A12b are bent upwardly to allow the dowel K to enter into the hole Hd.

Since the middle plate A11 has the recessed portions A11c larger than the dowel K, when the pointed portions A12b are bent, the pointed portions A12b are urged to partly locate inside the recessed portions A11c. Also, the pointed portions A11b are slightly bent and located in the hole A10a of the upper plate A10. The pointed portions A11b do not project beyond the upper surface of the upper plate A10.

In the gasket A, the pointed portions A11b, A12b are vertically piled or spaced from each other, and are formed on the different plates. Thus, the pointed portions A11b, A12b act separately to the dowel K, so that when the gasket A is engaged with the dowel K, the gasket A is not accidentally disengaged from the cylinder block J. Especially, in case the plates A11, A12 are formed of different plates in thickness or hardness, the engaging forces of the pointed portions A11b, A12b relative to the dowel K become different. Thus, the gasket can be securely fixed to the dowel.

Generally, the two dowels are formed on the cylinder block J. When the dowels K enter into the dowel holes Hd, the gasket A does not move and is properly positioned on the cylinder block J.

Figure 4:
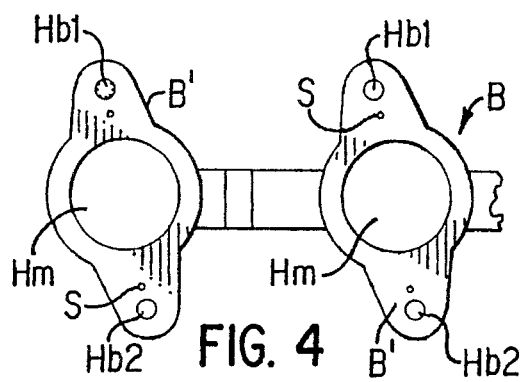
FIG. 4 is a plan view of a part of a second embodiment of the invention for constituting a manifold gasket.
Figure 5:
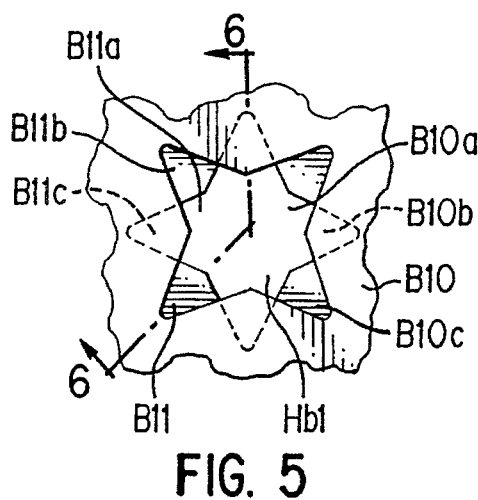
FIG. 5 is an enlarged plan view of a bolt hole of the manifold gasket shown in FIG. 4.
Figure 6:
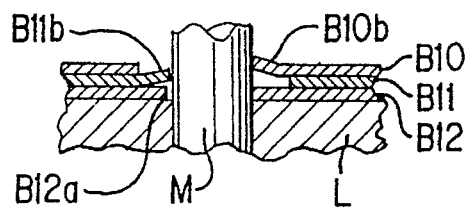
FIG. 6 is a section view taken along a line 6—6 in FIG. 5 for showing the manifold gasket installed on a manifold.

FIGS. 4–6 show a second embodiment B of the gasket of the invention. The gasket B is a manifold gasket to be attached to a cylinder head L with bolts M. The gasket B is formed of a plurality of units B' for sealing around the respective holes for a manifold.

Each unit B' includes a hole Hm and bolt holes Hb1, Hb2, and is formed of an upper plate B10, a middle plate B11 and a lower plate B12, which are connected together by the spot welding S. The lower plate B12 of one unit B' is integrally connected to the adjacent lower plate B12 of another unit B' to thereby form one integral gasket B formed of several units B'. One example of the manifold gasket is disclosed in U.S. Pat. No. 4,728,110.

The upper plate B10 includes a hole B10a defined by four engaging or pointed portions B10b and four non-engaging or recessed portions B10c. The distance between the pointed portions B10b facing against each other is smaller than the diameter of the bolt M. The distance between the recessed portions B10c facing against each other is greater than the diameter of the bolt M.

The middle plate B11 is situated under the upper plate B10 and includes a hole B11a defined by four engaging or pointed portions B11b and four non-engaging or recessed portions B11c. Similar to the upper plate B10, the distance between the pointed portions B11b facing against each other is smaller than the diameter of the bolt M, while the distance between the recessed portions B11c facing against each other is greater than the diameter of the bolt M.

The lower plate B12 is located under the middle plate B11, and includes a hole B12a slightly larger than the bolt M. The holes B10a, B11a, B12a constitute the bolt hole Hb1. The bolt hole Hb2 is made of simple holes formed in the respective plates.

The upper and middle plates B10, B11 are arranged such that the pointed portions B11b of the middle plate B11 are located under the recessed portions B10c of the upper plate B10. Namely, the pointed portions B10b, B11b are angularly shifted relative to the bolt hole Hb1. Thus, when the gasket B is pushed over the bolt M, the pointed portions B10b, B11b are slightly bent upwardly, and engage the bolt M. The pointed portions B10b slightly project upwardly, while the pointed portions B11b are located inside the recessed portions B10c. The gasket B does not accidentally disengage from the cylinder head L.

When the manifold is placed on the cylinder head L and the bolt M is tightened, the pointed portions B10b projecting upwardly are bent and are substantially flattened. In this respect, an additional plate may be provided on the upper plate so that the pointed portions B10b may be located in a hole of the additional plate without projecting outwardly.

In the metal laminate gasket of the present invention, the plates are provided with holes defined by pointed and recessed portions vertically spaced from each other. When the gasket is pushed over the dowel or bolt, the pointed portions are bent to securely engage the gasket to the engine part. Since the pointed portions independently act relative to the dowel or bolt, even if the engine part is transferred in an assembly line, the gasket does not accidentally disengage from the engine part.

While the invention has been explained with reference to the specific embodiments of the invention, the explanation is illustrative, and the invention is limited only by the appended claims.

What is claimed is:

1. A metal laminate gasket adapted to be engaged with an engaging projection of an engine part for immovably locating the gasket on the engine part, comprising, a first plate including at least one first hole having a size generally corresponding to the engaging projection of the engine part, a plurality of first engaging portions with pointing ends having a size smaller than that of the engaging projection, and a plurality of first non-engaging portions, each first non-engaging portion being situated between two adjacent first engaging portions, the width of each first engaging portion sandwiched between two adjacent first non-engaging portions decreasing in a direction toward the pointing end, said first engaging portions and first non-engaging portions defining the first hole, and a second plate situated above and engaging the first plate, said second plate including at least one second hole having a size generally corresponding to the first hole and located above the first hole, a plurality of second engaging portions with pointing ends having a size smaller than that of the engaging projection and a plurality of second non-engaging portions, each second non-engaging portion being situated between two adjacent second engaging portions, the width of each second engaging portion sandwiched between two adjacent second non-engaging portions decreasing in a direction toward the pointing end thereof, said second engaging portions and second non-engaging portions defining the second hole, said second engaging portions being located above the first non-engaging portions and said second non-engaging portions being located above the first engaging portions so that when the first and second plates are urged against the engine part, the first and second engaging portions deform to allow the engaging projection to enter into the first and second holes and engage the engaging projection to thereby prevent the gasket from easily disengaging from the engaging projection.

2. A metal laminate gasket according to claim 1, wherein said first and second holes are bolt holes for the engine part.

3. A metal laminate gasket according to claim 1, wherein said first and second engaging portions are different in thickness.

4. A metal laminate gasket according to claim 1, wherein said first and second engaging portions are different in hardness.

5. A metal laminate gasket according to claim 1, wherein each of said first and second non-engaging portions is defined by a curved edge, and each of said first and second engaging portions is defined by two curved edges of the non-engaging portions.

6. A metal laminate gasket adapted to be engaged with an engaging projection of an engine part for immovably locating the gasket on the engine part, comprising, a first plate including at least one first hole having a size generally corresponding to the engaging projection of the engine part, a plurality of first engaging portions having a size smaller than that of the engaging projection, and a plurality of first non-engaging portions, each first non-engaging portion being situated between two adjacent first engaging portions, said first engaging portions and first non-engaging portions defining the first hole, and a second plate situated above and engaging the first plate, said second plate including at least one second hole having a size generally corresponding to the first hole and located above the first hole, a plurality of second engaging portions having a size smaller than that of the engaging projection, and a plurality of second non-engaging portions, each second non-engaging portion being situated between two adjacent second engaging portions, said second engaging portions and second non-engaging portions defining the second hole, said first and second engaging portions being different in thickness and spaced vertically and said first engaging portions being arranged angularly differently to the second engaging portions with respect to central axes of the first and second holes which coincide with each other to thereby locate the first engaging portions under the second non-engaging portions so that when the first and second plates are urged against the engine part, the first and second engaging portions deform to allow the engaging projection to enter into the first and second holes and engage the engaging projection to thereby prevent the gasket from easily disengaging from the engaging projection, said first engaging portions being located in the second non-engaging portions when the first engaging portions are bent.

7. A metal laminate gasket adapted to be engaged with an engaging projection of an engine part for immovably locating the gasket on the engine part, comprising, a first plate including at least one first hole having a size generally corresponding to the engaging projection of the engine part, a plurality of first engaging portions having a size smaller than that of the engaging projection, and a plurality of first non-engaging portions, each first non-engaging portion being situated between two adjacent first engaging portions, said first engaging portions and first non-engaging portions defining the first hole, and a second plate situated above and engaging the first plate, said second plate including at least one second hole having a size generally corresponding to the first hole and located above the first hole, a plurality of second engaging portions having a size smaller than that of the engaging projection, and a plurality of second non-engaging portions, each second non-engaging portion being situated between two adjacent second engaging portions, said second engaging portions and second non-engaging portions defining the second hole, said first and second engaging portions being different in hardness and being spaced vertically and said first engaging portions being arranged angularly differently to the second engaging portions with respect to central axes of the first and second holes which coincide with each other to thereby locate the first engaging portions under the second non-engaging portions so that when the first and second plates are urged against the engine part, the first and second engaging portions deform to allow the engaging projection to enter into the first and second holes and engage the engaging projection to thereby prevent the gasket from easily disengaging from the engaging projection, said first engaging portions being located in the second non-engaging portions when the first engaging portions are bent.

* * * * *

UNITED STATES PATENT AND TRADEMARK OFFICE
CERTIFICATE OF CORRECTION

PATENT NO. : 5,586,770
DATED : December 24, 1996
INVENTOR(S) : Tsunekazu Udagawa, Kenji Yamada It is certified that error appears in the above-indentified patent and that said Letters Patent is hereby corrected as shown below:

Column 1, line 47, change "5,259,624" to --5,259,629--.

Signed and Sealed this

Eleventh Day of March, 1997

*Attest:*

BRUCE LEHMAN

*Attesting Officer*  *Commissioner of Patents and Trademarks*